April 9, 1968   H. D. BRAILSFORD   3,377,537
ELECTRIC PUMPING SYSTEM CONTROLLED BY R-C LIQUID
LEVEL MEASURING DEVICE
Filed April 6, 1965
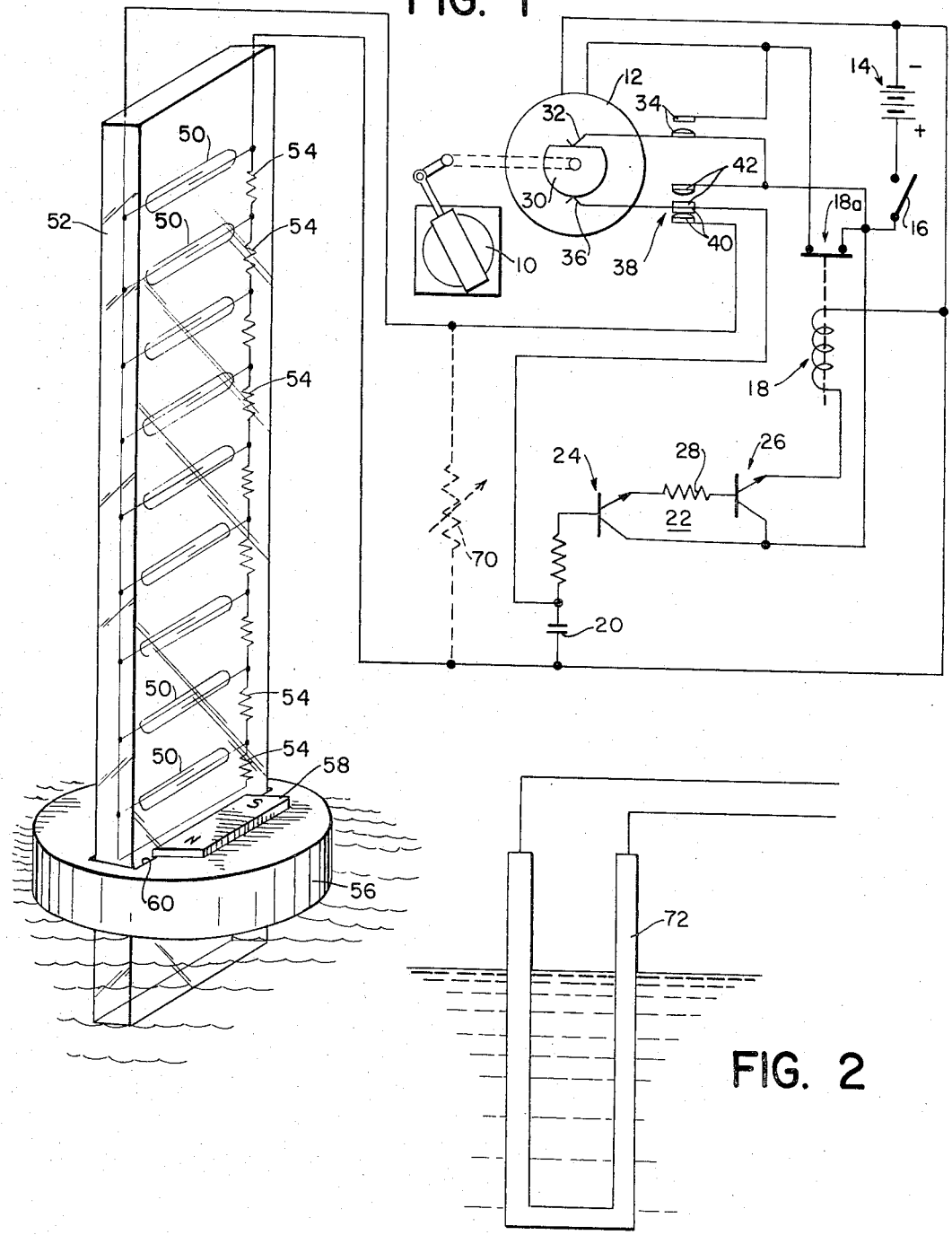
FIG. 1
FIG. 2
*INVENTOR.*
HARRISON D. BRAILSFORD
BY 
ATTORNEY

United States Patent Office 3,377,537
Patented Apr. 9, 1968

3,377,537
ELECTRIC PUMPING SYSTEM CONTROLLED BY R-C LIQUID LEVEL MEASURING DEVICE
Harrison D. Brailsford, 670 Milton Road,
Rye, N.Y. 10580
Filed Apr. 6, 1965, Ser. No. 445,968
6 Claims. (Cl. 318—444)

The present invention relates to an automatic pumping system intended primarily for the collection of samples of water from streams, industrial outfalls and sewers, to test for impurities. It will be readily apparent, however, that the invention has considerably broader application.

The current practice for collecting samples of water to test for impurities is to take samples at fixed spaced intervals, or to pump automatically on a continuous basis. It has been found, however, that in some cases where samples are taken at such uniform rates, either intermittently or continuously, the collected sample may not be an accurate composite or representative percentage-wise of the total pollution ratio present during the period under investigation. For example, in a sewer the velocity of flow will vary over a relatively wide range at different times of the day or night. Samples taken at a uniform rate will result in erroneous indications in that those taken during slack periods of flow will predominate, while those taken at maximum velocities will be correspondingly deficient.

It is an object of the present invention to provide a new and improved pumping system.

It is another object of the present invention to provide a pumping system which will pump automatically at a rate dependent upon the velocity of flow in the stream or sewer being tested.

It is a further object of the present invention to provide a pumping system of the character described which may be adjusted for either a constant or an intermittent cycle.

It is still another object of the present invention to provide an accurate liquid level sensing device which, in turn, provides an accurate indication of the velocity of a stream in which it is placed.

A pumping system constructed in accordance with the present invention includes a pump and means for driving the pump at a regulated rate, dependent upon the level of the liquid to be pumped. Such a pumping system also includes means for sensing the level of the liquid to be pumped and for developing a control effect dependent upon the level of this liquid to regulate the drive means.

For a better understanding of the present invention, together with other and further objects thereof, reference is had to the following description, taken in connection with the accompanying drawings and its scope will be pointed out in the appended claims.

Referring to the drawing:

FIG. 1 illustrates a pumping system constructed in accordance with the present invention; and FIG. 2 illustrates an alternate liquid level sensing device which may be employed in the system shown in FIG. 1.

Referring to FIG. 1, a pumping system constructed in accordance with the present invention includes a pump 10. The pump 10 may be of conventional construction and operation.

Also included in the pumping system according to the present invention are means for driving pump 10 at a regulated rate, dependent upon the level of the liquid to be pumped. Such means may include a motor 12, mechanically coupled to the pump 10, for driving the pump. A source of power, in the form of a D-C source 14, is also provided for driving the motor 12. The D-C source 14 is connected through an ON-OFF switch 16 and a first switching means, in the form of a relay 18 and its contacts 18a, to the motor 12. The operation of relay 18 is such that when the relay is not energized, the contacts 18a are closed, and when the relay is energized, the contacts 18a are open.

Also provided are means including a charged capacitor 20 for initiating the drive of the pump 10 after the capacitor has discharged to a prescribed voltage level. More specifically, the capacitor 20, when charged, renders a circuit 22, composed of a pair of transistors 24 and 26 and a resistor 28, conductive, thereby energizing the relay 18. This, in turn, causes contacts 18a to open. After the capacitor 20 has discharged to a prescribed level, the circuit 22 is rendered non-conductive, thereby de-energizing relay 18 and closing contacts 18a. The closing of contacts 18a, in turn, effects the correction of D-C source 14 to the motor 12, thereby initiating the drive of the pump 10.

In the starting condition of the circuit, with the mechanical parts in the position shown in FIG. 1, but with switch 16 closed, the relay 18 will not be energized and the motor 12 will receive energizing current via the contact 18a. As the motor 12 turns, a cam 30 affixed to the output shaft of the motor also turns. After approximately 90° of rotation from the starting position, the cam 30, urging a resiliently mounted cam follower 32 upward, actuates a second switching means composed of a pair of contacts 34 and causes the closure of these contacts. The closure of contacts 34 maintains the connection of the D-C source 14 to the motor 12 even after the contacts 18a open later in the cycle, which occurs when the charged capacitor 20 renders circuit 22 conductive, thereby energizing relay 18. The mechanical details of the construction and actuation of the contacts 34 have been omitted from the drawing for the sake of clarity. It is obvious, however, that conventional techniques utilizing restraining springs may be employed.

After approximately 180° of rotation from the starting position, the cam 30 permits a second resiliently mounted cam follower 36 to move upward, thereby actuating a third switching means composed of a double throw contact assembly 38. In particular, the double throw contact assembly 38 is reversed, with a pair of contacts 40 opening and another pair of contacts 42 closing. This has the effect of connecting the capacitor 20 directly across the D-C source 14 so as to charge the capacitor to the full voltage of the source. At this point the circuit 22 is rendered conductive, thereby energizing relay 18 and opening the contacts 18a. The motor 12, however, continues through its cycle due to the fact that the D-C source 14 is connected to the motor through the closed contacts 34. Again, the details of the construction and actuation of the double throw contact assembly 38 have been omitted from the drawing for the sake of clarity, but it will be apparent that conventional techniques may be employed.

The initiation of the discharge of capacitor 20 is synchronized with a predetermined point in the cycle of the motor 12. After approximately 230° of rotation, the double throw contact assembly 38 is returned to its initial condition by the action of the cam follower 36 being urged downward, thereby disconnecting the capacitor 20 from the source 14 and connecting it to a discharge circuit to be described below. The motor 12 continues to turn until it completes one revolution from its starting position since the D-C source 14 remains connected to the motor 12 for the remainder of the cycle of the motor due to the closed contacts 34. After a full revolution is completed, the contacts 34 open since the cam follower 32 is no longer urged upward. The motor 12 remains idle in the starting position until capacitor 20 is discharged to the prescribed level.

The pumping system of the invention further includes means for sensing the level of the liquid to be pumped and for developing a control effect dependent upon the level of this liquid to regulate the drive imparted to the pump 10. In particular, the level sensing apparatus may include a plurality of magnetic reed switches 50 mounted within a strip of suitable insulating material 52 such as acrylic or other plastic. One end of each of the magnetic reed switches 50 is connected to a common terminal which is connected to one of the contacts 40. The opposite end of each of the magnetic reed switches 50 is connected to its neighboring switches through resistors 54. The serially-connected resistors 54 constitute the discharge circuit of the capacitor 20. The upper end of the series of resistors 54 is connected to one side of the capacitor 20.

A float 56, made of cork, for example, is provided with a magnet 58 and has a rectangular slot 60 which permits the float to move along the plastic strip 52. The plastic strip 52 is anchored in the body of water or other liquid to be sampled, but the float 56 is free to move up and down dependent upon the level of the liquid in which it is placed. The reed switch 50, at which the float is located at any particular instant, closes due to the effect of the magnet 58 carried on the float. Thus, all of the resistors 54 located below the level of the float are shorted out by the closure of the particular switch 50. The total resistance of the level sensing unit is, therefore, dependent upon the position of the float 56 and, more particularly, upon the level of the liquid in which the float is placed. The discharge time of the capacitor 20 is, accordingly, dependent upon the level of the liquid in which the float is placed and also upon the velocity of the liquid since the level of the liquid is dependent upon the velocity.

Relay 18 remains energized until after the capacitor 20 has discharged to the prescribed level at which time the circuit 22 is rendered non-conductive. At this point, the contacts 18a close and the cycle is repeated.

It should be understood, that the various references to points in the cycle of the motor at which events take place are merely exemplary. The D-C source 14 may be connected to the motor 12 for a shorter or longer interval than the one described. In addition, the charging and discharging of capacitor 20 may take place at different points in the cycle of the motor 12. The particular timing factors will depend upon the particular application and the values and the characteristics of the components used.

In order to manually operate the pumping system of the invention, a variable resistor 70, shown dotted, is provided, which, when set, produces the same effect as the level sensing device described above.

FIG. 2 shows a second embodiment of a variable resistance level sensing device. In this arrangement the resistance element is in the form of a U-shaped member 70 of carbon or other noncorrosive material. The resistance change is accomplished by the shorting action of the water itself as it rises and falls.

While there have been described what is at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:
1. In combination, a motor; a source of electric current to drive said motor; first switching means connected between said motor and said source to control the transmission of driving current to said motor, said switching means comprising a relay and means to control the operation of said relay, said means comprising a capacitor, discharging resistor means, and second switching means to connect said capacitor to said discharging resistor means during at least part of the time that said motor is running and to connect said capacitor to receive an electric charge during at least part of the time that said motor is not running.

2. The invention as defined in claim 1 in which said resistor means comprises a plurality of resistors and individual switches to incapacitate said capacitors individually to control the rate of discharge of said capacitor.

3. The invention as defined in claim 1 in which said resistor means comprises an elongated resistive element immersed in a conductive liquid whereby the resistance of said resistive element is determined by the extent of immersion in said liquid.

4. The invention as defined in claim 1 in which said first switching means comprises, in addition: a short circuiting switch actuated by said motor after said motor has begun to run to connect said motor directly to said source independently of said relay during at least part of one revolution of said motor.

5. The invention as defined in claim 1 in which said first switching means comprises a transistor circuit having an input circuit connected to said capacitor to be controlled thereby so as to be conductive as long as said capacitor has at least a predetermined electric charge thereon and said transistor circuit has an output circuit connected to said relay to energize the same as long as said transistor circuit is conductive.

6. The invention as defined in claim 1 in which said second switching means comprises a double throw switch and a cam connected to said motor to close a first pair of contacts of said switch when said motor is inoperative to connect said discharging resistor means across said capacitor, said cam actuating said second switching means to close a second pair of contacts during at least part of the time said motor is running to connect said capacitor to said source of electric current.

References Cited

UNITED STATES PATENTS

| | | | |
|---|---|---|---|
| 2,619,620 | 11/1952 | Tapp et al. | 318—482 X |
| 2,700,131 | 1/1955 | Otis et al. | 318—444 X |
| 3,030,890 | 4/1962 | Galik | 318—48 X |
| 3,195,816 | 7/1965 | Mercer | 318—483 X |
| 3,252,420 | 5/1966 | Sorensen | 318—482 X |

ORIS L. RADER, *Primary Examiner.*

J. C. BERENZWEIG, J. J. BAKER, *Assistant Examiners.*